FIP8102 OR 3,906,350

United St[illegible]

Musiak

R59

[11] 3,906,350

[45] Sept. 16, 1975

[54] NYQUIST SLOPE FILTER USEFUL FOR MONITORING VIDEO MODULATION AT TRANSMITTING STATION

[75] Inventor: Ronald E. Musiak, Westfield, Mass.

[73] Assignee: Comark Industries, Incorporated, Westfield, Mass.

[22] Filed: Mar. 12, 1973

[21] Appl. No.: 340,084

[52] U.S. Cl................... 325/133; 333/70 R; 333/75

[51] Int. Cl............................. H04b 1/02; H03l 7/04

[58] Field of Search......... 333/70 R, 70 CR, 75, 74, 333/14; 325/133, 136

[56] References Cited

UNITED STATES PATENTS

| | | | |
|---|---|---|---|
| 2,701,862 | 2/1955 | Artzt | 333/74 |
| 2,788,496 | 4/1957 | Linvill | 333/75 X |
| 3,229,209 | 1/1966 | Critchlow et al. | 325/136 |
| 3,358,246 | 12/1967 | Bensasson | 333/75 X |
| 3,444,469 | 5/1969 | Miyagi | 333/14 X |

FOREIGN PATENTS OR APPLICATIONS

| | | | |
|---|---|---|---|
| 649,779 | 6/1964 | Belgium | 333/70 R |

*Primary Examiner*—Paul L. Gensler
*Attorney, Agent, or Firm*—Charles Hieken; Jerry Cohen

[57] ABSTRACT

A Nyquist slope video filter duplicates the i-f passband characteristics of a television receiver transformed to the video frequency range. It functions as a high-pass filter with a d-c path. A specific embodiment of the invention includes an input series arm, an output series arm and a shunt arm. The input series arm is an inductor. The output series arm is an inductor in series with a resistor, each shunted by a capacitor. The shunt arm is an inductor in series with a resistor, each shunted by a capacitor. Both series arms are bridged by a capacitor.

4 Claims, 6 Drawing Figures

NYQUIST SLOPE FILTER USEFUL FOR MONITORING VIDEO MODULATION AT TRANSMITTING STATION

BACKGROUND OF THE INVENTION

The present invention relates in general to filtering and more particularly concerns novel apparatus and techniques for providing a Nyquist slope filter that duplicates the passband characteristics of a television receiver, but at video frequencies. The invention is especially useful for detecting video information on a modulated carrier detected with ordinary double sideband demodulation techniques, such as, a simple diode detector, and levelling it so that the output of the filter according to the invention corresponds to the input video signal at the television transmitter, thereby providing a useful technique for monitoring the video modulation on a television carrier at the transmitting station.

In standard television vestigial sideband transmission typically employed, one sideband is partially suppressed before the television signal is transmitted. By using vestigial sideband transmission instead of true single-sideband transmission, receiver filter requirements are appreciably reduced. A typical television receiver approximates with a stagger-tuned i-f strip the idealized characteristic of a linear response from 750 kHz below to 750 kHz above the carrier frequency, uniform from the latter frequency to 4.2 above carrier and linearly decreasing to zero at 4.5 MHz above carrier frequency. Establishing and maintaining circuit alignment can be a problem.

Accordingly, it is an important object of this invention to provide a filter that duplicates substantially the ideal passband characteristic of a television receiver for receiving standard vestigial sideband transmission, but at video frequencies, to facilitate detecting a video signal with ordinary double sideband amplitude demodulation techniques while providing a video signal that corresponds to the original video signal impressed upon the carrier before partially suppressing one of the sidebands.

It is a further object of the invention to achieve the preceding object with apparatus that is relatively easy and inexpensive to fabricate.

It is a further object of the invention to achieve one or more of the preceding objects with apparatus that does not require alignment and that retains the desired characteristic substantially indefinitely.

It is a further object of the invention to achieve one or more of the preceding objects while presenting input and output impedances that may be conveniently matched to a transmission line.

SUMMARY OF THE INVENTION

According to the invention, a video correction filter includes means defining an input and an output. Resistive means and reactive means intercouple the input and the output. The resistive means comprises means for establishing a predetermined first finite substantially uniform attenuation between d-c and a first frequency, typically 0.5 MHz, of the transfer characteristic between the input and the output. The reactive means coacts with the resistive means for establishing a predetermined substantially linear increase in the response as a function of frequency of the transfer characteristic from the first frequency to a second frequency, typically 1.25 MHz, above the first frequency. The reactive means includes means for providing a substantially uniform response as a function of frequency for the transfer characteristic in the frequency range above the second frequency to at least a third frequency, typically above 4.2 MHz, in the video frequency range. Typically the resistive means and the reactive means comprise an input series branch having an inductor in series with an output series branch, the output series branch having an inductor in series with a resistor and each shunted by a capacitor, a shunt branch interconnecting a common terminal with the junction between the input and output series branches and having an inductor in series with a resistor with each shunted by a capacitor, and a bridging capacitor intercoupling the input and the output. Preferably the resistive means and the reactive means coact to present a predetermined characteristic impedance at the input and the output with the resistor in the shunt arm having a resistance corresponding substantially to twice the characteristic impedance and the resistor in the output series arm corresponding substantially to the characteristic impedance.

A system according to the invention preferably comprises double-sideband amplitude demodulating means coupled to the input and a source of a carrier signal having the vestigial sideband demodulation coupled to the double-sideband amplitude modulating means.

Numerous other features, objects and advantages of the invention will become apparent from the following specification when read in connection with the accompanying drawing in which:

DETAILED DESCRIPTION OF PREFERRED EMBODIMENT

Figure 1:
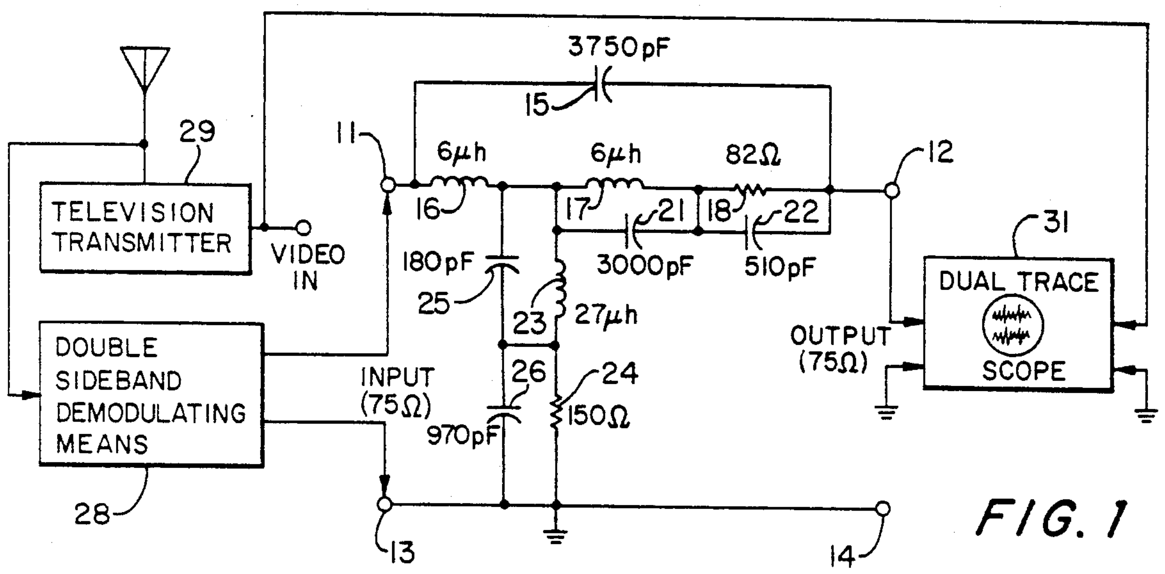
FIG. 1 is a combined block-schematic circuit diagram of a preferred embodiment of the invention.

With reference now to the drawing and more particularly FIG. 1 thereof, there is shown a combined block-schematic circuit diagram of a preferred embodiment of the invention with the specific circuit embodied in the commerically available Comark Model 1910 Nyquist Slope Filter. The invention comprises an input signal terminal 11, an output signal terminal 12, and input and output common terminals 13 and 14, respectively, with the RLC network therebetween providing the transfer function shown in FIG. 6. With the specific parameters illustrated the desired response is provided for input and output impedances of substantially 75 ohms. This network can be scaled for other characteristic impedances.

The circuit may be described as a bridged T with capacitor 15 bridging input terminal 11 to output terminal 12. Inductor 16 comprises the input series arm. Inductor 17 in series with resistor 18, each shunted by capacitors 21 and 22, respectively, comprise the output series arm. Inductor 23 in series with resistor 24, each shunted by capacitors 25 and 26, respectively, comprise the shunt arm.

The input terminal 11 receives the detected video signal provided by double-sideband demodulating means 28, which may be an ordinary diode, energized by the output of television transmitter 29. The output terminal 12 provides to one input of dual trace oscilloscope 31 the modified detected video signal for comparison with the video input signal at transmitter 29 applied to the other input of oscilloscope 31.

Having described the structural arrangement of an exemplary of the invention, it is appropriate to describe certain design principles. At d-c, there is an L resistor attenuator with resistor 24 in the shunt arm and resistor 18 in the output series arm. If $Z_0$ is the characteristic impedance of the transmission lines to which input and output are to be connected, resistor 24 is preferably $2Z_0$, and resistor 18 is $Z_0$. In a practical embodiment of the invention for a transmission line impedance of 75 ohms, resistor 18 was chosen to have the closest standard value of a 10 per cent resistor. It is preferred that inductors 16 and 17 be the same value.

The design criteria for the invention involves bridged 'T' network synthesis techniques; in particular, such techniques for all pass, constant R networks. It was discovered that by deliberately "unbalancing" this type of network (the "balanced" condition yields a flat passband characteristic for all frequencies but a 180° phase shift at the design frequency) a bandpass characteristic similar to that needed to generate the Nyquist slope is produced. However, using strictly an LC network of this form will not produce the complete passband characteristic needed (the "inverse boot" response). A resistive 'L' pad was introduced to establish the proper low frequency response (−6dB attenuation from DC to 0.5 MHz). Shunt capacitance was added across the resistors to reduce their loading effects on the LC portion of the network. This design approach yields a network which has a constant characteristic impedance over its entire operating frequency range and a controllable slope in the transmitional region of the amplitude versus frequency response. In this particular application, the slope is fixed at 8dB/MHz.

Figure 2:
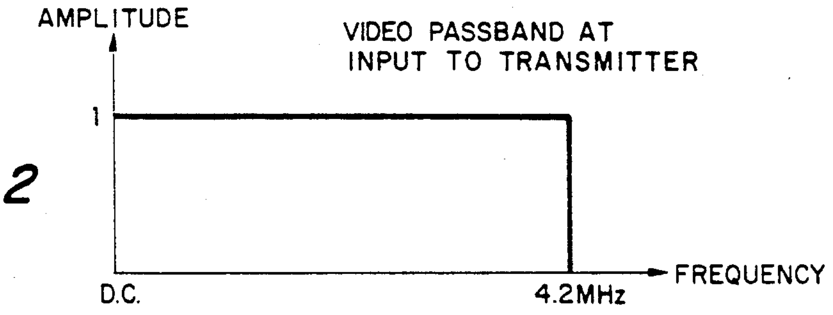
FIG. 2 is a graphical representation of the video passband at the input to a television transmitter.

Having described the circuit according to the invention and certain design principles, it is appropriate to consider certain idealized passband characteristics helpful in understanding the invention. Referring to FIG. 2, there is shown the video passband at the input to the transmitter. This response is uniform from d-c to 4.2 MHz and substantially zero above.

Figure 3:
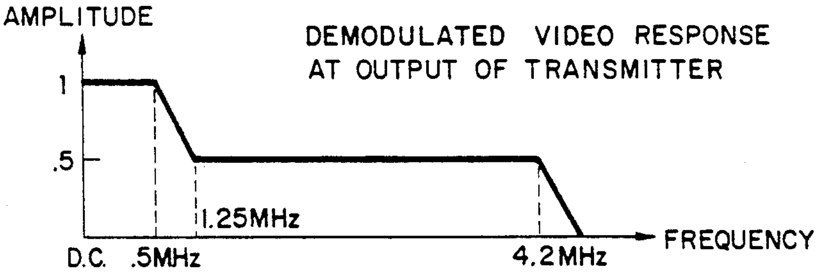
FIG. 3 is a graphical representation of the effective video response at the output of a transmitter following detection with conventional double-sideband amplitude demodulation techniques.

Referring to FIG. 3, there is shown the effective response at the output of the transmitter following demodulation of the video on the carrier with conventional double-sideband amplitude demodulation techniques resulting because of the vestigial sideband transmission. The effective response is uniform and a peak from d-c to 500 kHz, decreases linearly to ½ peak at 1.25 MHz, remains uniform to 4.2 MHz and decreases linearly to zero at 4.5 MHz, the frequency of the audio subcarrier.

Figure 4:
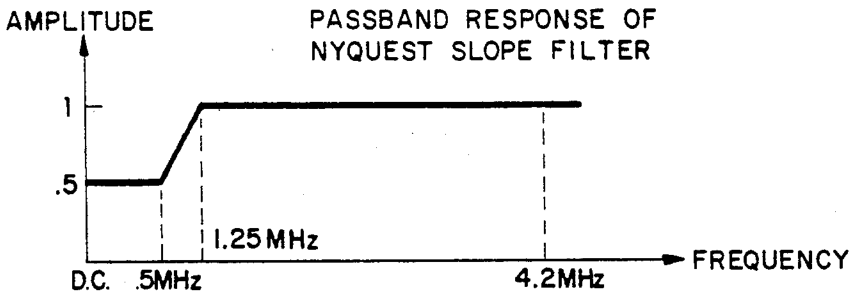
FIG. 4 is the passband response of the Nyquist slope filter according to the invention of FIG. 1.
Figure 5:
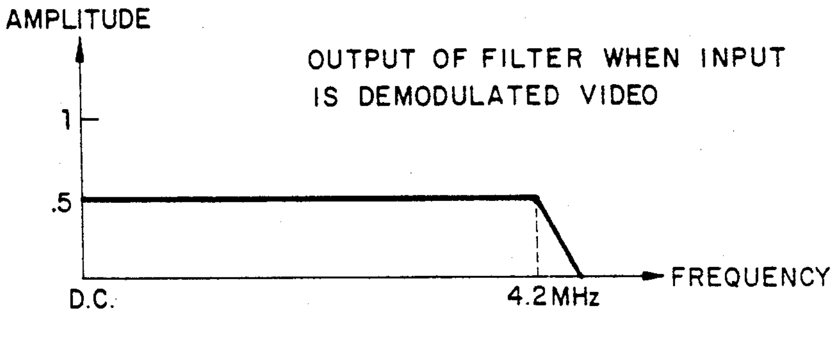
FIG. 5 is the effective frequency response characteristic between the transmitter output and the output of the filter according to the invention of FIG. 1 when a conventional double-sideband amplitude demodulation circuit detects the transmitter output and delivers the detected transmitter output to the input of the circuit of FIG. 1.

Referring to FIG. 4, there is shown the idealized passband response of a Nyquist slope filter according to the invention which is uniform at half peak from d-c to 500 kHz as a result of means for establishing a predetermined first finite attenuation between d-c and a first frequency of the transfer characteristic between the input and output, rises linearly to peak at 1.25 MHz as a result of means for establishing a predetermined substantially linear increase in the response as a function of frequency of the transfer characteristic from the first frequency to a second frequency above the first frequency and remains substantially uniform above this frequency as a result of means for providing a substantially uniform response as a function of frequency for the transfer characteristic in the frequency range above the second frequency to produce a product response shown in FIG. 5 that is the effective response between the transmitter output and the output between terminals 12 and 14 when an ordinary double-sideband amplitude demodulator intercouples the transmitter output and input terminals 11 and 13. This overall response is substantially uniform from d-c to 4.2 MHz and decreases linearly to zero at 4.5 MHz. Thus, if a video sweep generator energizes the video input of the transmitter with a signal of uniform amplitude over the video frequency range, and the transmitter is operating properly, the amplitude response of the signal provided between terminals 12 and 14 is substantially that shown in FIG. 5.

Figure 6:
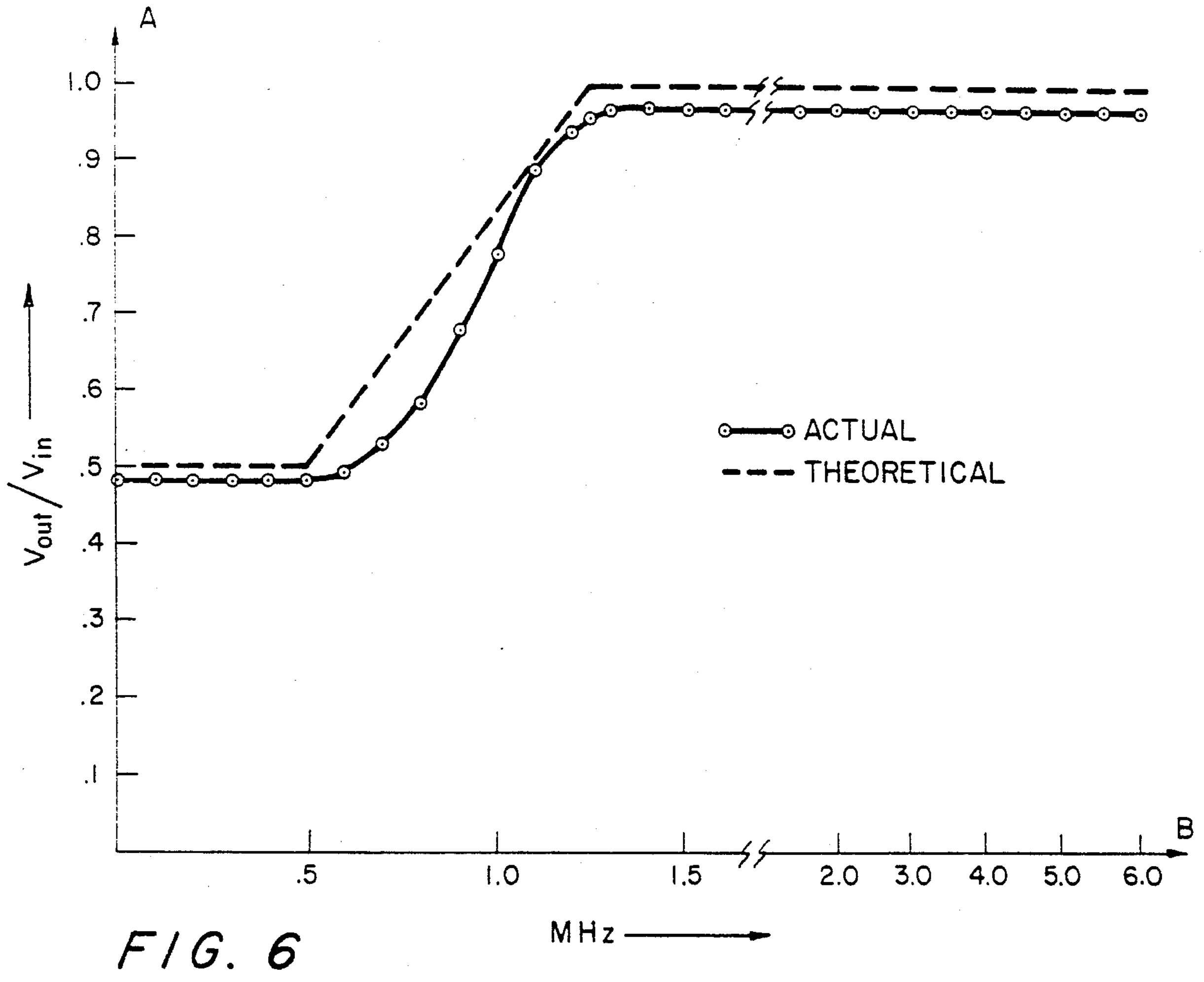
FIG. 6 is a graphical representation of the actual measured response of the filter of FIG. 1 compared with the ideal response illustrated in FIG. 4.

Referring to FIG. 6, there is shown a graphical representation of the actual frequency response of the circuit of FIG. 1 with the indicated parameter values in solid lines compared with the idealized response indicated in dotted lines. By comparing the video signal between terminals 12 and 14 with the video signal applied to the transmitter video input on oscilloscope 31, an engineer at the station transmitter may readily observe any differences that indicate subpar performance of the transmitter.

The resistive elements comprise means for establishing the desired 6 dB attenuation of the video low frequency components from d-c to 0.5 MHz. The reactive elements coact with the resistive elements to comprise means for establishing the nearly linear slope between 0.5 MHz and 1.25 MHz. The bridging capacitor 15 comprises means for establishing substantially zero attenuation between input and output above 1.25 MHz.

There has been described novel apparatus and techniques for simulating the pass-band characteristics of a television receiver to facilitate monitoring video at the transmitter at video frequencies in co-operation with a conventional double-sideband amplitude demodulator without alignment and in a reliable manner with structure relatively easy and inexpensive to fabricate while requiring virtually no maintenance. The invention may also be used at the output port of those receivers, such as in certain spectrum analyzers, designed to receive double-sideband signals. In general the invention is useful with any receiver that does not already have circuitry with a Nyquist slope response. It is evident that those skilled in the art may now make numerous uses and modifications of and departures from the specific embodiments described herein without departing from the invention concepts. Consequently, the invention is to be construed as embracing each and every novel feature and novel combination of features present in or possessed by the apparatus and techinques herein disclosed.

What is claimed is:

1. Video correction filter apparatus comprising,
means defining an input,
means defining an output,
resistive means and reactive means intercoupling said input and said output,
said resistive means comprising means for establishing a predetermined first finite substantially uniform attenuation between d-c and a first frequency of the transfer characteristic between said input and said output,
said reactive means coacting with said resistive means for establishing a predetermined substantially linear increase in the response as a function of frequency of said transfer characteristic from said first frequency to a second frequency above said first frequency,
said reactive means including means for providing a substantially uniform response as a function of frequency for said transfer characteristic in the frequency range above said second frequency to at least a third frequency in the video frequency range,
wherein said resistive means and said reactive means comprise,
an input series branch having an inductor in series with an output series branch,
said output series branch having an inductor in series with a resistor and each shunted by a capacitor,
a shunt branch interconnecting a common terminal with the junction between said input and output series branches and having an inductor in series with a resistor with each shunted by a capacitor,
and a bridging capacitor intercoupling said input and said output.

2. Video correction filter apparatus in accordance with claim 1 wherein said resistive means and said reactive means coact to present a predetermined characteristic impedance at said input and said output,
said resistor in said shunt arm having a resistance corresponding substantially to twice said characteristic impedance,
said resistor in said output series arm corresponding substantially to said characteristic impedance.

3. Video correction filter apparatus in accordance with claim 1 and further comprising double-sideband amplitude demodulating means coupled to said input.

4. Video correction filter apparatus in accordance with claim 3 and further comprising a source of a carrier signal having vestigial sideband modulation coupled to said double-sideband amplitude demodulating means.

* * * * *